Oct. 5, 1971 V. M. BRASLAVSKY 3,610,020
DEVICE FOR COLD HARDENING THE TEETH OF A GEAR WHEEL
Filed July 31, 1968
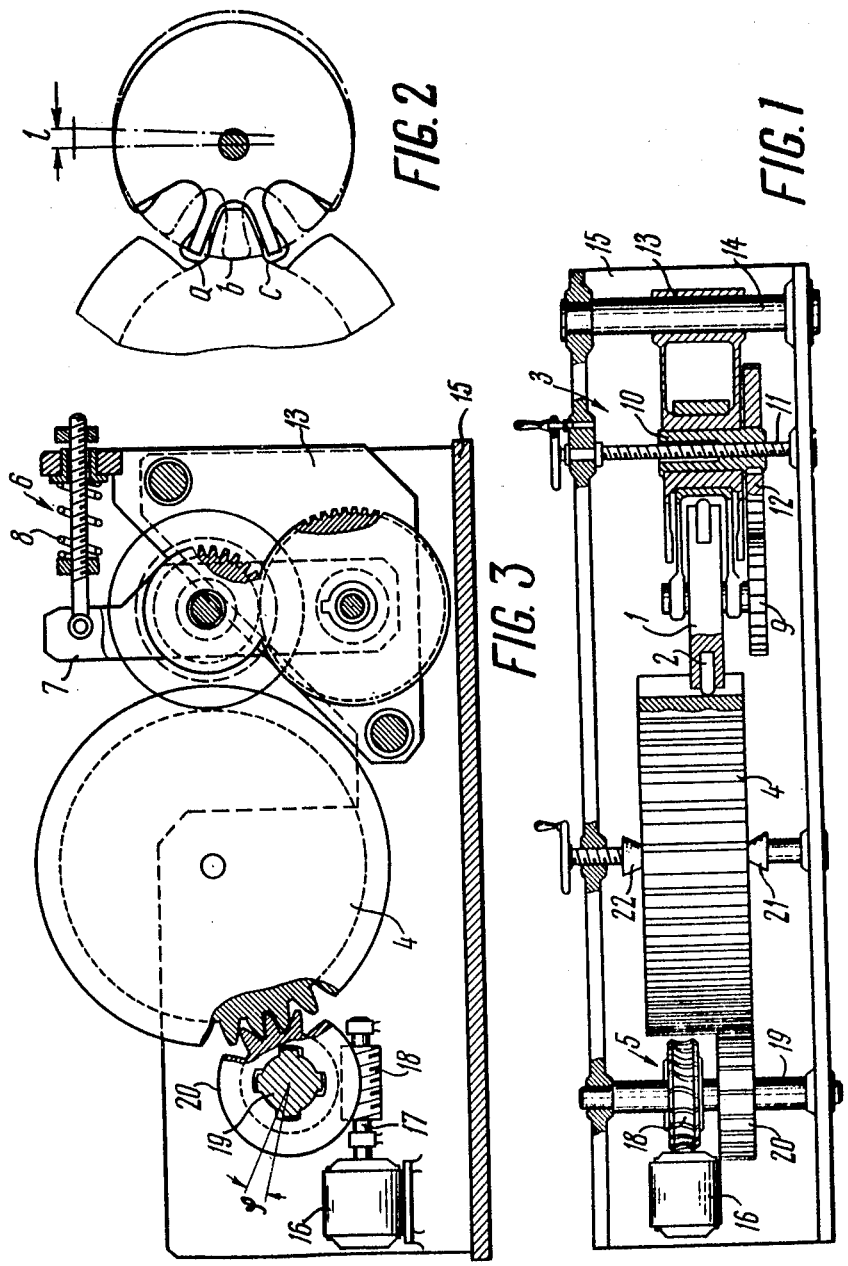

United States Patent Office 3,610,020
Patented Oct. 5, 1971

3,610,020
DEVICE FOR COLD HARDENING THE TEETH
OF A GEAR WHEEL
Veniamin Markovich Braslavsky, Ulitsa Frunze 65,
kv. 21, Sverdlovsk, U.S.S.R.
Filed July 31, 1968, Ser. No. 749,159
Int. Cl. B21j 7/02
U.S. Cl. 72—434          4 Claims

ABSTRACT OF THE DISCLOSURE

A gear wheel is driven in intermittent rotation and a disk with a plurality of radial punches circumferentially arranged thereon meshes with the gear wheel such that the radial punches apply force to the teeth of the gear wheel and produce local plastic deformation thereof to achieve cold hardening of the teeth. The disk is urged against the gear wheel by means of a resilient system and the punches are so spaced on the disk to provide varying center to center distances between the wheel and disk during rotation such that the resilient system is periodically deformed and produces impact of the punches against the teeth when the punches enter the spaces between the teeth. By means of a nut and screw connection the disk can be displaced parallel to the axis of rotation of the gear wheel in order to insure operation throughout the entire width of the wheel.

---

The present invention relates to finishing or strengthening workpieces and, more particularly, to devices for finishing gear wheels to strengthen the same.

The invention is most effective in finishing high-module gear wheels with a view to increasing the bending strength of their teeth.

There are known devices for strengthening gear wheels by means of cold hardening, and fitted with a roller whose profile complies with the profile of recesses between the wheel teeth. This roller reciprocates along the recesses of the gear wheel being finished, while said wheel, after each passage, turns with the aid of a divider by one tooth pitch for subsequent deformation of every recess.

A disadvantage of the known devices is the necessity of applying great working efforts, because the rollers employed in these devices have a relatively large diameter and a relatively small curvature in their axial section.

Where the size of gear wheels being treated increases, the diameter of the rollers increases proportionately and the required working effort rises many-fold.

Thus, for example, a working effort of 10,000 kg. is required to strengthen gear wheels of 10 mm. size. Strengthening wheels of still larger sizes, used in heavy machine building, would require unreasonable working efforts.

Furthermore, the reciprocating motion of the roller and a subsequent turn of the wheel being strengthened by one tooth pitch require the employment in the known devices of mechanisms of complicated design.

It is an object of the present invention to provide a device for strengthening gear wheels noted for its simple design.

The invention is aimed at providing a device for finishing gear wheels permitting the effective strengthening of large size gear wheels at small working efforts.

These and other objects of the invention have been achieved by providing a device for strengthening gear wheels by means of the impact of a tool on the surface of a wheel being strengthened in the recesses between the teeth until the local plastic deformation is secured, wherein, according to the invention, the tool is constructed as a rotating disk with radially arranged, punches, resiliently pressed against the wheel being strengthened with the aid of a power mechanism creating static load and producing impact when the punches enter the recesses between the wheel teeth. Also provided in the device is a mechanism for turning said wheel and allowing its intermittent rotation.

When finishing thick gear wheels, the device should be provided with a mechanism for displacing the disk with punches parallel to the axis of the wheel being finished.

This mechanism may include a kinematic drive comprised of a nut and screw, wherein the nut is rotated by the above-said disk with punches via a gearing.

The mechanism allowing intermittent rotation of the wheel being finished may be fashioned as a driving pinion set on the driving shaft with a clearance large enough to insure a through turn of the wheel by half of the tooth pitch.

The invention will become more apparent from the description of an exemplary embodiment thereof, reference being had to the appended drawings, wherein:

FIG. 1 is a plan view of the device of the invention;

FIG. 2 is a disk with punches, employed in the device shown in FIG. 1; and

FIG. 3 is a front view of the device shown in FIG. 1.

The device for finishing gear wheels comprises a tool in the form of a disk 1 (FIG. 1) with punches 2, a mechanism 3 for displacing said disk parallel to the axis of a wheel 4 being finished, and a mechanism 5 for turning said wheel 4.

The disk 1 (FIG. 2) is toothed and carries the punches 2, the shape of whose working portion cross-sectionally corresponds with the profile of the recesses between the teeth of the gear being strengthened, while in its axial section the disk has a radius of curvature permitting said punches to freely enter the recesses between the wheel teeth. The disk is pressed against the wheel by a power mechanism 6 (FIG. 3) comprising a rocking lever 7 and an actuating member in the form of a spring 8.

The power mechanism 6 produces static load and causes impact when the punches 2 enter the recesses of the teeth of the gear wheel 4 being finished, which makes the strengthening of the latter more effective.

The mechanism 3 (FIG. 1) for displacing the disk 1 parallel to the axis of the wheel 4 comprises a gear 9 rigidly set on the axis of the disk 1, and a kinematic coupling, constituted of a nut and a screw 10 and 11 respectively. The nut 10, via gear 12 engaged with the gear 9, when rotated, displaces a carriage 13 along guides 14 mounted on a bed 15. The rocking axis of the lever 7 is coaxial with the shaft of the gear 9 and secured on the bed 15. One end of the spring 8 interacts with the lever 7, while the other is fixed on the carriage 13.

The mechanism 5 turning the wheel being finishing and permitting its irregular rotation, comprises an electromotor 16 imparting rotation to a splined driving shaft 19 on which a driving pinion 20 is set, via worm gearing 17–18. Provided between the pinion 20 and the shaft 19 on which said pinion is set is a clearance $\varphi$ (FIG. 3) insuring a through turn of the wheel 4 being finished by half of its tooth pitch.

The device is operated as follows.

The gear wheel 4 being finished, arranged in centers 21 and 22, is actuated by the pinion 20 and imparts rotation to the disk 1 having the punches 2, which disk 1 is resiliently pressed towards the recesses between the wheel teeth under the action of the power mechanism 6. Engagement of the disk 1 having the punches 2 with the wheel 4 is effected at a continuously varying center-to-center distance. This distance is minimum when one of the punches is in position $a$ (FIG. 2). Then it becomes larger as the gear wheel rotates and the punch occupies position $b$. As a result, the lever 7 deflects and the spring 8 becomes compressed accumulating additional energy equivalent to its compression a value "*l*" (FIG. 2). The punch passing beyond the position *b* toward position *c*, the disk itself accelerates the rotation of the wheel 4 being strengthened, while the next punch produces an impact on the appropriate tooth in position *a*, starting again to compress the power mechanism 6.

This mode of operation of the device is possible owing to the provision of the clearance $\varphi$ between the driving pinion 20 (FIG. 3) and the shaft 19. The wheel being treated may thus rotate irregularly, quicker than the rotating shaft 19 of the driving pinion at the moment of impact, and may allow intermittent rotation.

In the cross-section of the disk 1, the punches 2 have a curvature radius allowing them to freely enter the recesses between the gear wheel teeth. Along with the impact-type application of the load, this permits with small working effort, to secure effective deformation of the recesses between the teeth and a sizable increase in the bending strength of the teeth.

To make possible the working of the recesses throughout the entire width of the wheel being finished, the disk 1 is displaceable parallel to the wheel axis, by reason of the rotation of the nut 10 by the gear 12 through the gear 9 rigidly set on the axis of the disk 1. The nut 10 displaces the carriage 13 along guides 14 when the screw 11 is stationary.

I claim:
1. A device for strengthening the teeth of a gear wheel, said device comprising means for rotatably supporting a gear wheel, means for rotating the gear wheel and allowing irregular rotation thereof, a carriage, a lever pivotably mounted on said carriage, a rotatable disk supported on said lever, a plurality of radial punches circumferentially arranged on said disk and facing said gear wheel for meshing with the teeth of the gear wheel and applying force to said teeth to produce local plastic deformation thereof to achieve cold hardening of the teeth; and resilient means supported by said carriage and acting on said disk to press the punches against the teeth of the gear wheel, said punches being spaced on said disk to provide varying center-to-center distance between the wheel and disk during rotation whereby to cause the resilient means to be periodically stressed and produce impact of the punches against the teeth when the punches enter the spaces between the teeth.

2. A device as claimed in claim 1 comprising means for displacing said disk parallel to the axis of rotation of the gear wheel.

3. A device as claimed in claim 2 wherein said means for displacing said disk parallel to the axis of rotation of the gear wheel comprises a fixable screw, a rotatable nut on said screw and gearing means between said disk and nut to drive the latter when the disk rotates.

4. A device as claimed in claim 1 wherein said means for rotating the gear wheel comprises a driving pinion for said gear wheel and a drive shaft for said pinion, said driving pinion being mounted with sufficient clearance on said drive shaft for turning of said gear wheel through one half its tooth pitch.

References Cited
UNITED STATES PATENTS

| | | | |
|---|---|---|---|
| 897,872 | 9/1908 | Burn | 72—102 |
| 1,001,799 | 8/1911 | Anderson | 72—102 |
| 2,227,491 | 1/1941 | Drummond | 29—90 |
| 2,245,654 | 6/1941 | Drader | 29—90 |
| 2,658,259 | 11/1953 | Aldino | 29—90 |
| 3,455,139 | 7/1969 | Flowers | 72—451 |

CHARLES W. LANHAM, Primary Examiner

G. P. CROSBY, Assistant Examiner

U.S. Cl. X.R.
29—90 B; 72—437